Dec. 10, 1968  J. H. LUX  3,415,913
PROCESS FOR MAKING A SEWABLE POLYETHYLENE UPHOLSTERY MATERIAL
Filed April 13, 1965
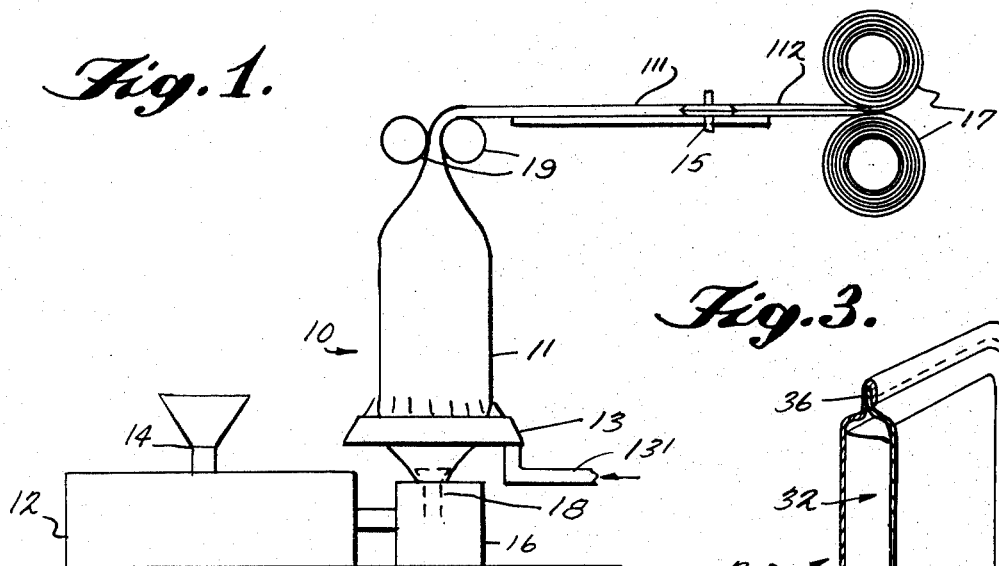
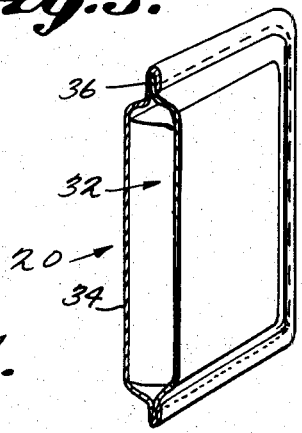
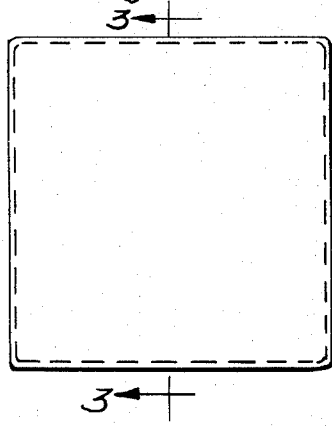
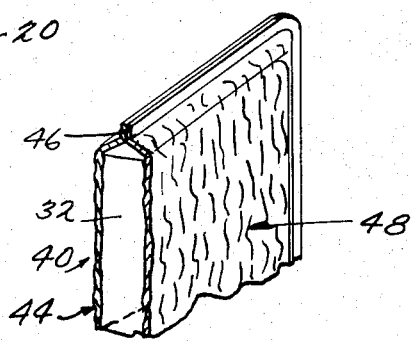
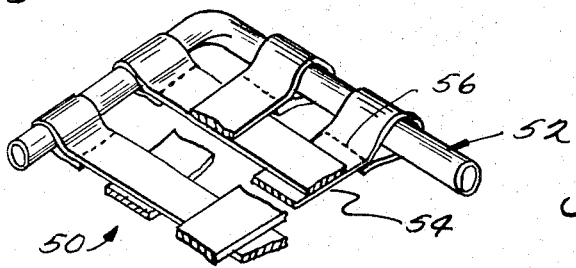
INVENTOR
JOHN H. LUX
BY Cushman, Darby & Cushman
ATTORNEYS

United States Patent Office 3,415,913
Patented Dec. 10, 1968

3,415,913
PROCESS FOR MAKING A SEWABLE POLY-
ETHYLENE UPHOLSTERY MATERIAL
John H. Lux, Wilmington, Del., assignor to Haveg Industries, Inc., Wilmington, Del., a corporation of Delaware
Filed Apr. 13, 1965, Ser. No. 447,860
8 Claims. (Cl. 264—48)

ABSTRACT OF THE DISCLOSURE

A process for producing a sewable, skinned, foamed sheet with the appearance of leather is disclosed, wherein a foamable mono-olefin polymer composition is extruded and a stream of air, which is at a temperature well below the extrusion temperature, is directed upon at least one surface of the extrudate before the extrudate has completely foamed, to produce an impervious skin on the extrudate surface, and thereafter the skinned, foamed sheet produced is crumpled and uncrumpled.

---

The present invention relates to a novel process for making upholstery sheet material and more particularly to a stitchable upholstery sheet material consisting of a foamed monoolefin polymer matrix with impervious skins of the same composition as the matrix, formed integrally with the matrix.

It has been previously proposed to utilize a foam backing upon upholstery material. Considerable work has been done in an effort to impart to flexible plastic surface coverings a high degree of resilience. Plastic surface coverings can be directly laminated to thin foam rubber or other types of foams by means of an adhesive to produce a highly resilient product, but this product has the weakness of being susceptible to delamination at the adhesive bond. It has also been known to produce a partially fused vinyl organisol or plastisol layer, coat the partially fused layer with a foamable vinyl resin layer, and heat the two layers to fuse and bond the vinyl layers together and foam the foamable composition. The several steps involved in this type of process add considerably to the equipment requirements and to the processing costs, and in general are not applicable for low density polyethylene and polypropylene. Such a process is claimed by George F. Paulus in U.S. Patent No. 3,076,234.

It is an object of the invention to produce a novel upholstery material of a skinned monoolefin polymer foam sheet where the skin is of the same material as the foam matrix, and is formed integrally with the foam.

Another object of the present invention is to produce an improved monoolefin polymer upholstery sheet material which is easily sewn and has outstanding tear reresistance.

A further object of the invention is to provide an improved process for making a monoolefin polymer upholstery sheet material which has the appearance of leather.

An additional object of the instant invention is to produce an improved, stitchable skinned foam upholstery sheet material from low density polyethylene and polypropylene.

In accordance with the invention, a foamable monoolefin polymer composition is extruded and blown into a bubble on blown tubular extrusion equipment. The air passing through a cooling ring surrounding the bubble, and also the air injected inside the bubble, is at a temperature well below the extrusion temperature. This low temperature retards the foaming of the outer and inner surfaces of the foamable bubble structure and produces impervious skins. As this is only a surface chilling, the matrix of the bubble structure will foam, essentially as though no surface chilling had occurred. The bubble structure is biaxially stretched to produce more uniform properties. The skinned foam sleeve structure is then slit and the resultant sheets are taken up on a roll to be used as upholstery material.

FIGURE 1 is a schematic view of an apparatus which may be used in the manufacture of the novel upholstery sheet material.

FIGURE 2 is a top view of an upholstery cushion made with the novel upholstery sheet material.

FIGURE 3 is a cross-section on the line 3—3 of FIGURE 2.

FIGURE 4 shows another embodiment of the upholstery cushion of FIGURE 2, and is also a cross-section on the line 3—3 of FIGURE 2.

FIGURE 5 is a view of a portion of a lawn chair made from the novel upholstery sheet material.

In the drawings, 10 represents a blown tubular extrusion machine. Pellets of a foamable monoolefin polymer composition are fed to hopper 14 which discharges to an extrusion screw contained in extrusion portion 12. Part 16 of the machine contains the tubular extrusion die, which is fed by the extrusion screw. As in conventional blown tubular extrusion processes, air is injected through nozzle 18 inside the tube formed by the tubular die. The air pressure is greater than the atmospheric pressure, and expands the tube into the bubble 11. The air temperature is below the extrusion temperature, and cools the inner surface of bubble 11. Relatively cool air is introduced through duct 131 to cooling ring 13 which directs the air upon the entire outer surface of bubble 11.

The air which expands the bubble 11 also produces a lateral stretching of the bubble structure. Rolls 19 pull the bubble 11 at a faster rate than which it is extruded to produce a longitudinal stretch. Thus, the bubble is biaxially stretched, imparting uniform properties to the foamed sheet.

The rolls 19 also collapse the bubble 11 into a flat sleeve 111. The sleeve 111 is split into two sheets 112 by splitter 15. The sheets 112 are then collected on rolls 17 and are ready for use as upholstery material.

Article 20 of FIGURE 2 represents an upholstery cushion which could be used, for example, on a sofa or chair. The details of the construction of cushion 20 are shown by FIGURE 3. A core 32 of resilient material, for example, sponge rubber or urethane foam, is enclosed by a covering of the novel upholstery material 34 of this invention. Two pieces of the upholstery material 34 are used to enclose the core 32, and the two pieces are joined by a sewn seam 36.

The cushion 40 of FIGURE 4 is another embodiment of the cushion 20. A resilient core 32 is enclosed by a covering of novel upholstery material 44. Two pieces of upholstery material 44 are joined by a heat weld seam 46 to make the covering. Prior to assembly of the cushion, the pieces of upholstery material 44 are crumpled and uncrumpled to produce a leathery appearance on the surface 48 of the pieces.

The article 50 of FIGURE 5 represents a view of the corner of a lawn chair. The chair is made with a frame 52, for example, of tubular aluminum, supporting a web 54 of strips of the novel upholstery material of this invention. The strips of the web 54 are joined to the frame 52 by loops formed by sewn seams 56.

A conventional blown tubular extrusion machine can be used in the practice of the instant invention. An external bubble cooling ring with associated ducting must be added as well as a source of relatively cool air to be fed to one or both the cooling ring and the internal bubble air nozzle. The bubble collapsing rolls and the slitter are conventional. Guide rolls leading the bubble into the bubble collapsing rolls may be added, as well as guide rolls between the bubble collapsing rolls and the collecting rolls.

While the preferred method of producing the skinned foamed sheets of this invention is by the use of blown tubular extrusion equipment, conventional sheet extrusion equipment may also be utilized. As the sheet is extruded, its surfaces are rapidly cooled by air blasts directed on one or both surfaces. The core is allowed to foam and then the sheet is biaxially stretched.

It is essential for the uses contemplated that the foam sheet have at least one dense skin of some appreciable thickness (3 mils, for example).

While the preferred embodiment of this invention is a foam with integrally united skins on both sides, it is also within the scope of the invention to foam a skin on only one side. This may be done by eliminating the chilled air passing through the cooling ring, or else by using higher temperature air in the interior of the bubble.

Thus there is formed a foam sheet with integral skins on one or both sides. Each unfoamed skin is 3 to 25% of the thickness of the final product and the foamed portion to which the unfoamed impervious skin (or skins) is integrally united is 50 to 97% of the total thickness. The foamed product can have a thickness from 10 mils to 1 inch or more.

The invention is useful in preparing products with very light foam cores, e.g., having a density as low as 1 lb./cu. ft., but is particularly useful in preparing foams of higher density, e.g., having a density of 18–45 lbs./cu. ft. and preferably 20–35 lbs./cu. ft. The skins will have a density of about that of the unfoamed composition.

Air is the preferred chilling means as it will not react with the monoolefin polymer composition and is generally the cheapest means available. However, an air-water mist, argon, helium or other inert fluid may be used. When air is the chilling means, it may be used at temperatures preferably from 0 to 100° F. and at flow rates preferably from 40 to 100 feet per second.

Conventional extrusion temperatures can be used and range from 110° to 250° C., preferably 130° to 180° C. The particular temperature employed can be easily determined by those skilled in the art and will depend upon the particular monoolefin polymer employed in the potentially foamable composition. Generally, the pressure in the extruder is sufficient that the gas present in the composition remains dissolved in the monoolefin polymer phase. Generally, the pressure is at least 1500 p.s.i.

Although most foamable monoolefin polymer compositions may be used in the practice of this invention, the preferred composition is produced by mixing a monoolefin polymer with a minor amount of an absorbent having absorbed thereon a volatile liquid which is nonreactive with and which has not more than a slight solvent action on the polymer. The volatile liquid should volatilize below the softening point of the monoolefin polymer. The preferred mode of incorporating the foaming agent into the foamable composition is by premixing a pelletized, solid monoolefin polymer with a minor amount of an absorbent having absorbed thereon the volatile liquid.

The preferred monoolefin polymer employed in the foamable composition of the invention is low density polyethylene (density 0.914–0.92, for example) or polypropylene. However, medium density (0.94 density, for example) and high density (0.96 density, for example) polyethylene may be used. Further, copolymers of ethylene with minor amounts of alpha monoolefins having 4 to 10 carbon atoms such butene-1 (e.g., 90:10 and 97.5:2.5) or octene-1 (96:4) or copolymers of ethylene and propylene (e.g. 50:50 copolymer, 60:40 copolymer and 20:80 copolymer, for example) can also be employed. Additionally, homopolymers and copolymers of other monoolefins can also be employed.

As the absorbent there can be employed any conventional absorbent in finely divided form, such as diatomaceous earth (Celite), fuller's earth, silica gel, e.g., Cab-O-Sil, and Hi-Sil, activated alumina, molecular sieves, attapulgus clay and activated carbon. The absorbent used in an amount of 0.1 to 15%, preferably 0.5 to 10% by weight of the monoolefin polymer, although up to 25 or 30% of absorbent can be employed. The absorbent is an inert filler of large surface area but small particulate size, e.g., 200 mesh or below.

As the volatile liquid there can be used aliphatic hydrocarbons boiling between 10° and 100° C. and preferably between 30° and 90° C., e.g., petroleum ether (containing primarily pentane or hexane or a mixture of these hydrocarbons), pentane, hexane, isopentane, heptane, cyclohexane, cyclopentane, pentadiene, and neopentane. Other volatile liquids include methanol, ethanol, methyl acetate, ethyl acetate, butane, acetone, methyl formate, ethyl formate, dichloroethylene, perchloroethylene, dichlorotetrafluorethane, isopropyl chloride, propionaldehyde, diisopropyl ether, dichlorodifluoromethane, a mixture of pentane with 5 to 30% of methylene chloride or other volatile lower halogenated hydrocarbon.

The amount of volatile liquid absorbed on the absorbent can vary from 5 to 150% or more based on the weight of the absorbent. The amount of liquid absorbed will depend upon the capacity of the absorbent for the particular liquid. Normally, the absorbent containing the volatile liquid will appear to be a dry powder. The volatile liquid employed should be one which is nonreactive with the particular monoolefin polymer employed. Usually, the amount of volatile liquid will be 0.1 to 15% by weight of the monoolefin polymer, e.g., polypropylene, to be foamed. The amount of volatile liquid will depend upon the extent of foaming desired. In general, the greater the amount of absorbed volatile liquid in the monoolefin polymer absorbent mixture the more the expansion. It has been found that good expansion can be obtained using very small amounts of the volatile liquid.

Further, a nucleating agent is also, preferably, employed in the potentially foamable composition utilized with the instant invention. Conventionally, the nucleating agents are made up of two materials which react to form carbon dioxide and water. The two materials are normally used in approximately equivalent amounts. As the carbon dioxide liberating materials, there can be ammonium, alkali and alkaline earth carbonates or bicarbonates, e.g., ammonium bicarbonate, sodium bicarbonate, sodium carbonate, potassium bicarbonate, calcium carbonate. The other material is an acid or acid-reacting salt, preferably solid, which is sufficiently strong to liberate the carbon dioxide from the carbonate or bicarbonate. Generally, the acid has at least 30 milliequivalents of acidic hydrogen, and preferably, at least 10.0 milliequivalents per gram. The acid can be organic or inorganic. Suitable acidic materials include boric acid, sodium dihydrogen phosphate, fumaric acid, malonic acid, oxalic acid, citric acid, tartaric acid, potassium acid tartrate, chloroacetic acid, maleic acid, succinic acid and phthalic acid. In place of the anhydrous acids or salts there can be used the solid hydrates, e.g., oxalic acid dihydrate and citric acid monohydrate. Thereafter they are compounded with the other components of the foamable composition to avoid any substantial rehydration by atmospheric moisture.

While not essential, there can also be added a wetting agent such as Bayol 35 (a petroleum aliphatic hydrocarbon white oil), kerosene having an average of at least 8 carbon atoms in the molecule, alkylphenolalkylene oxide adducts, e.g., Triton X–100 (t-octylphenol-ethylene oxide adduct having 10 ethylene oxide units in the molecule), sodium lauryl sulfate and sodium dodecylbenzene sulfonate. The wetting agent can be nonionic or anionic.

The free flowing powder consisting of the low boiling solvent or semi-solvent adsorbed on the inert filler of large surface area is added to the extrusion grade plastice pellets, preferably along with the nucleating agent, and tumbled in a mixer. The powder containing the volatile blowing agent will then disperse uniformly throughout the mixture while adhering to the plastic pellets. The mixture is then fed into the hopper of an extruder.

Uniform foam of densities as low as 30 pounds per cubic foot have been obtained with as little as 1–3% of a 50:50 mixture of pentane or heptane and Hi-Sil 233 (precipitated silica) in regular high pressure low density polyethylene or linear polyethylene (prepared utilizing Phillips or Ziegler type catalysts).

If more than 3% of the volatile liquid-absorbent is used, it is preferable to first master-batch in a Banbury mixer to insure good dispersion in the extruder and prevent agglomeration of the filler as a pigment.

The foams prepared normally have closed cells of uniform size, usually with a cell diameter of from 0.01 to 0.5 mm.

If desired, conventional pigments and dyes may be added to the foamable composition.

If desired, further modification of the mechanical properties of the foamed monoolefin polymer can be achieved by adding to the foamable composition a small amount, e.g., 0.1–5% of a cross-linking agent or cross-linkable polymer additive with the requisite co-reactant such as ethylene-propylene terpolymer with dicyclopentadiene. Additionally, butyl rubber, styrene butadiene copolymer, styrene divinyl benzene copolymer and styrene-maleic anhydride adducts can be used.

Moreover, modification of the mechanical properties of the foamed monoolefin polymer can be achieved by the employment of peroxide or other free radical engendering materials in amounts of 0.1–5%, preferably 0.5–1%. Suitable free radical engendering materials include peroxides such as di-α-cumyl peroxide, di-isobutyl peroxide, di t-butyl peroxide, acetyl peroxide, lauryl peroxide, barium peroxide, sodium peroxide, hydrogen peroxide, stearyl peroxide, benzoyl peroxide, acetyl benzoyl peroxide, acetone peroxide, triacetone peroxide, ethyl hydrogen peroxide, diethyl peroxide, t-butyl-α-cumyl peroxide, cumene hydroperoxide peresters, e.g. t-butyl perbenzoate, di t-butyl diperphthalate, perborates, e.g. sodium perborate, persulfates, e.g. potassium persulfate, perchlorates, e.g. sodium perchlorate, aliphatic azo-compounds, e.g. 2-azo-bis-isobutyronitrile, azido cross-linking agents, e.g. 1,10-decane-bis (sulfonylazide), organo-metallic compounds, e.g., tetraethyl lead, tetramethyl lead and tin tetraphenyl. Such free radical engendering substances are well known as cross-linking agents for polyethylene and polypropylene, e.g. see Pinkney Patent 2,628,214; Precopio Patent 2,888,424; Cole Patent 2,936,261 and Johnstone Patent 3,137,745 as well as Great Britain Patents 619,905 and 659,958.

As an alternative, the foamable composition can be treated with high energy ionizing irradiation. The irradiation can be to an extent of 2 megarad to 20 megarad. Rainer Patent 2,877,500; Baird Patent 3,022,543 and the Cole patent referred to above show suitable irradiation conditions. The Baird patent also defines the term rad and the somewhat similar term rep.

While the skinned foam sheet may be stretched to any degree within the range of 100 to 900%, in either direction, it is preferred that the stretching in both directions be equal and about 300% for optimum uniform properties.

A desirable feature of the skinned foam sheet, when made of polyethylene or polypropylene, for upholstery uses is the property of the skin surface to acquire a wrinkled leather-like appearance once the skin has been crumpled and uncrumpled. Not only does this simulate leather in appearance, but it further enhances the toughness and tear resistance of the surface.

It is theorized that the rapid cooling of the skins by the cool air in the case of polyethylene and polypropylene produces a less crystalline and therefore a more flexible product than does the conventional, slower air cooling normally employed in blown tubular extrusion. Also, both the biaxial stretching and the crumpling to produce a leather-like wrinkling produce a more uniform, stronger product.

The skinned foam sheet of this invention exhibits outstanding tear resistance. In fact, the skinned foam sheet product is tear resistant even after it has initially been torn and repaired by sewing. This is in marked contrast to sheets of unfoamed low density polyethylene and polypropylene, which tear very readily once a tear or hole has occurred. Any tears or holes in the skinned foam product of this invention are not self-propagating, which results in a vastly superior sewable product.

Yet another desirable and unusual property of the skinned foam sheets is resistance to the accumulation of static charges on the sheets. Ordinary polyethlene articles have a difficult problem of dust accumulation due to static charges on the articles. It is theorized that this property is due to the presence in the product of traces of salts from the preferred formulation (such as that used in Example I).

Example I 50 parts of n-heptane and 50 parts of Hi-Sil 233 (silica gel) were mixed in a sealed mixer until a uniform free flowing powder was produced. There was then dry tumbled and subsequently extruded in the previously described blown tubular extrusion machine the following formulation:

| | Parts |
|---|---|
| Polyethylene (regular, high pressure, density 0.917) | 100 |
| n-Heptane-Hi-Sil powder | 2 |
| Sodium bicarbonate | 0.375 |
| Citric acid (anhydrous powder) | 0.3 |
| Bayol 35 | 0.25 |

The melt temperature was 350° F and the chilled air temperature was 70° F. The bubble was biaxially stretched 300% in each direction. The bubble was slit and the resultant skinned foam sheets were collected on rolls and sent to storage. The skinned foam sheet had a total thickness of 155 mils with skins 15 mils thick. The foam core density was 37 pounds per cubic foot.

Example II 50 parts of n-pentane and 50 parts of Hi-Sil 233 were mixed in a sealed mixer until a uniform free flowing powder was produced. There was then dry tumbled and subsequently extruded the following formulation:

| | Parts |
|---|---|
| Polyethylene (regular, high pressure, density 0.917) | 100 |
| n-Pentane-Hi-Sil powder | 2 |
| Sodium bicarbonate | 0.375 |
| Citric acid (anhydrous powder) | 0.3 |
| Bayol 35 | 0.25 |

The temperatures and the biaxial stretching were the same as in Example I. The bubble was slit and the sheet collected on a roll and sent to storage. The skinned foam sheet had a total thickness of 210 mils with skins 30 mils thick. The foam core density was 41 pounds per cubic foot.

Example III

To 100 parts of polypropylene there was added 10 parts of Celite having pentane absorbed thereon. (There were 3.5 parts of pentane and 6.5 parts of Celite to make up the total of 10 parts.) There was also added 4.5 parts of a stoichiometric blend of dry sodium bicarbonate and citric acid (in the ratio of citric acid to sodium bicarbonate of 3:4). The resultant mixture was thoroughly blended and extruded at 300° F. from the previously described blown tubular extrusion machine.

The chilled air was at 63° F. and the resultant skinned foam sheet had an overall density of 45 pounds per cubic foot.

Unless otherwise mentioned, all parts in the above examples refer to parts by weight.

Example IV

The skinned foam sheets of Examples I, II and III were crumpled and uncrumpled by hand. The resultant sheets had a wrinkled, leather-like appearance with improved toughness and tear strength.

A skinned foam sheet of this invention can be used to provide a superior quality, low cost plastic upholstery material. It can be used in the upholstery applications where leather or plasticized vinyl are now being used. As previously mentioned, the skinned foam sheet may be sewn or heat sealed.

In addition to resistance to puncture and tear, the skinned foam sheet product also has a rich supple feel and resistance to cracking, heat aging and staining.

The scope of this invention includes all upholstery applications where leather or plasticized vinyl are or could be used. Such uses include, but are not limited to, chair seats and backs, coverings for chair and sofa cushions, desk tops, automobile, airplane and boat interiors, suitcase linings, wall covering, etc.

The skinned foam sheets can also be used in a wide variety of other applications where their strength, lightness, tear resistance, insulating value, toughness and other properties are desirable properties. For example, it has been suggested to use the skinned foam sheets for bookbindings.

What is claimed is:

1. A method of preparing a skinned foam sheet with a leather-like appearance comprising adding to the extruder of blown tubular extrusion equipment a potentially foamable monoolefin polymer composition, subjecting the composition to heat and pressure in the extruder, extruding the composition through a tubular die, injecting air which is at a temperature well below the extrusion temperature inside the extruded sleeve at a pressure sufficient to expand the sleeve, directing a stream of air which is also at a temperature well below the extrusion temperature upon the outer surface of the extruded sleeve, bi-axially stretching the sleeve, collapsing the expanded sleeve, slitting the collapsed sleeve to produce a flat sheet, and crumpling and uncrumpling the flat sheet.

2. The method as claimed in claim 1 wherein the monoolefin polymer is a polymer of a monoolefin having 2 to 3 carbon atoms.

3. A process for producing a sewable, skinned foamed sheet with the appearance of leather comprising crumpling a skinned, foamed mono-olefin polymer sheet and thereafter uncrumpling said sheet, said sheet produced by extruding a potentially foamable mono-olefin polymer composition, wherein said mono-olefin polymer is a polymer of a mono-olefin having 2 to 3 carbon atoms and directing a stream of air which is at a temperature well below the extrusion temperature on at least one surface of said extruded polymer composition to produce an impervious skin on said surface.

4. The process as claimed in claim 3 including the additional step of bi-axially stretching the extruded monoolefin polymer composition.

5. The process as claimed in claim 3 wherein said mono-olefin polymer is polyethylene.

6. The process as claimed in claim 3 wherein said foamed sheet has a skin on at least one surface thereof said skin being 3% to 25% of the thickness of the said skinned, foamed sheet, and a foamed portion, to which said skin is integrally united, of 50% to 97% of the total thickness, said skin having a density approximately that of the unfoamed polymer composition.

7. The process as claimed in claim 6 wherein the core of the said foamed sheet has a density of about 18 to about 45 pounds per cubic foot.

8. The process as claimed in claim 3 wherein said extruded polymer composition is bi-axially stretched about 300% in each direction.

References Cited

UNITED STATES PATENTS

| | | | |
|---|---|---|---|
| 2,228,236 | 1/1941 | Stratton | 264—282 XR |
| 2,461,630 | 2/1949 | Cozzo | 18—14 |
| 3,082,483 | 3/1963 | Bickford | 264—321 |
| 3,159,700 | 12/1964 | Nakamura | 264—321 |
| 3,220,057 | 11/1965 | Walton | 264—282 XR |
| 3,221,954 | 12/1965 | Lux | 264—45 XR |
| 3,299,192 | 1/1967 | Lux | 264—48 |
| 3,311,681 | 3/1967 | Cherney et al. | 264—53 XR |
| 3,335,560 | 8/1967 | Ichikawa | 264—103 X |

FOREIGN PATENTS 854,586  11/1960  Great Britain.

OTHER REFERENCES

Collins, F. H., "Controlled Density Polystyrene Foam Extrusion." In SPE Journal, July 1960, pp. 705–709.

Murray, James A. H., Ed. A New English Dictionary on Historical Principles, vol. II, ©. Oxford, England, Claredon Press, 1893. Title page and page 1220.

JULIUS FROME, *Primary Examiner.*

PHILIP E. ANDERSON, *Assistant Examiner.*

U.S. Cl. X.R.

264—321, 282; 5—339; 112—413; 69—21; 161—128, 161